United States Patent [19]

Zeidler et al.

[11] Patent Number: 5,053,238

[45] Date of Patent: Oct. 1, 1991

[54] METHOD FOR SHELL REMOVAL FROM HARD BOILED EGGS

[75] Inventors: Gideon Zeidler, Los Angeles; David Reznik, Palo Alto, both of Calif.

[73] Assignee: The Regents of the University of California, Oakland, Calif.

[21] Appl. No.: 538,264

[22] Filed: Jun. 14, 1990
(Under 37 CFR 1.47)

[51] Int. Cl.$^5$ .......................... A23L 1/32; A23N 7/01
[52] U.S. Cl. ................................... 426/299; 426/298; 426/300; 426/287
[58] Field of Search ............... 426/298, 299, 300, 480, 426/614, 287; 99/568, 570, 574

[56] References Cited

U.S. PATENT DOCUMENTS

| | | | |
|---|---|---|---|
| 3,547,173 | 12/1970 | Graham et al. | 426/287 |
| 3,622,347 | 11/1971 | Aepli et al. | 426/480 |
| 3,796,817 | 3/1974 | Aepli et al. | 426/287 |
| 3,899,609 | 8/1975 | Lonneker et al. | 426/287 |

FOREIGN PATENT DOCUMENTS 2239956 10/1987 Japan .................................. 426/299

OTHER PUBLICATIONS

Dialog Data Base, File 5: Biosis Previews, Dialog Acc. No. 0002443849, Abstracting Poultry Sicence 57(1), 1978, pp. 149–155.

Dialog Data Base, File 351: World Patents Index, Dialog Acc. No. 3180619, Abstracting Japanese Patent Nos. 58047468 and 88045793.

Brown, R. J., 1984, "333 More Science Tricks and Experiments" Tab Books Inc., Blue Ridge Summit, Pa. p. 191.

UNESCO, 1958 "700 Science Experiments for Everyone" Doubleday & Co. Inc., Garden City, N.Y. p. 42.

*Primary Examiner*—Donald E. Czaja
*Assistant Examiner*—John C. Mowbray
*Attorney, Agent, or Firm*—Hana Dolezalova

[57] ABSTRACT

A novel method for shell removal from hard-boiled eggs using chemical methods or, in alternative, a combination of chemical with mechanical methods. The acid or alkali is used to soften the egg shell prior to mechanical peeling or to dissolve the shell completely. The egg membrane is removed by treatment with alkali.

21 Claims, No Drawings

METHOD FOR SHELL REMOVAL FROM HARD BOILED EGGS

BACKGROUND OF THE INVENTION

1. Field of the Invention

This invention concerns a novel method for shell removal from hard boiled eggs. In particular, this invention concerns the removal of shell from the hard boiled eggs using chemical means or, in alternative, a combination of chemical with mechanical means. The method allows peeling of freshly laid eggs and results in peeled hard cooked eggs with extended duration shelf life and with preserved flavor, texture and appearance.

2. The Background and Related Disclosures

Eggs are an important nutritional product. Hard cooked, peeled and packaged eggs are becoming increasingly popular in the institutional food service, in the food industry and in retail marketing. However, the extent of the hard-cooked eggs usage depends primarily on successful overcoming of problems connected with their boiling, storing, preservation, shelf life, taste, peeling and a large scale processing.

While the numerous advantages connected with the use of the hard boiled eggs, such as providing a nutritious food, healthy source of protein, good taste, colorfulness, long shelf life, ease of preparation and low cost, among others, are evident, the industrial or large scale usage of the hard boiled eggs depends on how the problems connected with the use of hard boiled eggs can be prevented or overcome.

Primary problems connected with a large scale production of the hard boiled peeled eggs are their boiling and peeling. Both boiling and peeling, but particularly peeling, can seldom be done without a damage to the egg white albumen, without affecting the shape and texture of the hard boiled eggs, or without effecting their taste or appearance. Generally, current methods used for the large scale hard boiled eggs peeling result in a low yield due to the damage to high percentage of eggs.

The problems connected with the peeling of the hard boiled eggs are sufficiently evident by the number of developed devices, apparatuses and methods. Until now known and used methods for eggs boiling and peeling include many types of mechanical peelers or egg shelling devices such as the device described in the U.S. Pat. No. 4,787,306 utilizing the tap water pressure for peeling eggs by water jet; apparatus for continuous peeling of boiled eggs according to the U.S. Pat. No. 4,311,089; automatic machine for peeling hard-boiled eggs described in the U.S. Pat. No. 4,344,359; or a combination of vibration and washing procedures such as shell removal from partially frozen eggs by mechanical vibrator which cracks the shell and then washes it out with water jet, according to the U.S. Pat. No. 3,634,531. Other mechanical egg peeling methods and apparatuses are described in U.S. Pat. Nos. 4,686,895, 4,191,102, 4,082,856, 4,056,051, 3,951,055, 3,859,907 and others.

Most of the mechanical devices developed for peeling of shell and membrane from the hard cooked eggs utilize the eggs cooked in water to a hard boiled level, followed by immediate cooling in order to prevent gray discoloration of the yolk's surface. Then the egg shell is cracked and peeled by various types devices as described in above cited patents.

The wholly mechanical peeling, however, produces inconsistent results. For example, some eggs are peeled completely, without leaving behind the shell or membrane residue, but some eggs, peeled in the same manner, remain to have the shell or membrane residues attached to the albumen. Similarly, some eggs have broken or damaged albumen and some eggs do not. Consequently, following the mechanical peeling the eggs must be manually sorted to separate those having the broken albumen or having the shell or membrane residues adhering to the albumen. Since only the wholesome undamaged and wholly peeled eggs are acceptable for restaurants and catering, the manual sorting is necessary before the undamaged eggs are moved to the packaging line. The eggs which have broken albumen are sorted out and are only used for salads and such other uses where the appearance and undamaged albumen does not matter. The eggs which have remainders of the shell or membrane still attached after the mechanical peeling are either manually cleaned or chopped to egg salad, both causing economical loss, because normally, the eggs to be used for egg salad are processed by separation of white and yolk and each cooked separately and chopped later. Such process is much faster, cheaper and easier. Consequently, any use of hard boiled eggs after peeling for egg salad is costly and therefore uneconomical.

Generally, operating such egg-peeling equipment results in lower yield of wholesome peeled eggs and thus a greater loss as the various machines tend to damage a high percentage of the eggs by breaking and cracking the eggs white albumen. Since the high percentage of hard boiled eggs is used for catering which requires that the eggs not only taste good but also look good, the damaged albumen is not only undesirable but it is often not acceptable.

Moreover, as described above, when mechanical peeling devices are used, some of the shell residues tend to adhere to the egg white requiring a time consuming and costly manual sorting and cleaning. Moreover, the remnants of the shells may contribute to a spoilage and contamination of the eggs and result in shorter shelf life of the product. Another very serious disadvantage of the mechanical peeling is that newly laid eggs cannot be successfully peeled by currently available equipment. The reason for this is a long known fact that the physical characteristics of the egg, particularly egg white changes during aging. These changes may be readily observed. The cooked albumen in fresh eggs is soft and more fragile, in aged eggs, it is more firm and solid. The membrane of the freshly laid eggs is strongly attached to both the shell and the albumen. In the freshly laid eggs, the inner shell membrane adheres closely to the cooked or coagulated albumen because the egg content contains carbon dioxide and is thus relatively acid having pH around 7.5. As the egg ages, carbon dioxide escapes, the acidity level is reduced and the pH is raised up to 8.5-9.8, resulting in the improved peelability. Previous attempts to remove the shell from the newly laid eggs therefore often resulted in damaged albumen due to breaking of the membrane having attached pieces of albumen. Since the fresh eggs are difficult to peel without extremely high losses, it is necessary to either age the eggs by storing them in the cold refrigerated room for two to three weeks or to age these eggs artificially.

In terms of a storage, the availability of the cold storage for two to three weeks is needed in order to naturally elevate the pH of the egg's albumen to optimal pH 8.6, at which pH it is possible to separate the membrane from the albumen. Even then, consistency of the peeling is a problem and invariably some batches will peel and other will not. And, of course, at that time the eggs are already two weeks old.

There were some attempts made to speed up the aging of the eggs by artificially raising the pH of the albumen by acceleration of the loss of carbon dioxide. As described in U.S. Pat. No. 3,216,828, such aging method facilitates the shell removal from the hard boiled eggs. Artificial aging according to the invention described in '828 patent is achieved by the treatment of the eggs with chemicals which absorb carbon dioxide. An exposure to ammonia fumes for 15 minutes during which time the pH of the albumen was raised to above 9.1, resulted in the easier mechanical removal of the shell. However, such long exposure to strong fumes may effect the taste of the eggs as it may result in the introduction of undesirable ammonia odors into the egg meat which odors must be removed by aeration. Thus, this process necessitates an introduction of another step, i.e., aeration. Alternatively, the eggs may be aged by soda lime, a mixture of sodium and calcium hydroxides.

All the above methods create many problems and encompass many disadvantages. In particular, these methods or devices leave behind a shell residue, cause broken albumen, damage high percentage of hard boiled eggs, require manual sorting, affect the taste, appearance and texture of the eggs, and require an introduction of additional methods for sorting, washing, aeration, taste restoration and odor removal. Moreover, as the newly laid eggs cannot be peeled, two to three weeks storage and refrigeration is additionally needed to raise pH of the albumen which allows its separation from the membrane. The necessity to wait for two to three weeks before eggs can be effectively peeled brings with it the loss of freshness, flavor, shortened shelf life and the cost of storage.

Typically, the egg industry expects to process, i.e., peel around 80 thousand eggs per hour. Thus, the economic loss caused by improperly peeled eggs, by introduction of additional methods or by the necessary storage and refrigeration is extreme. When the quarter million eggs per day needs to be stored for two to three weeks in the refrigerator and otherwise additionally handled (loading the refrigerator and removal of eggs after aging) lots of room, energy and manpower is necessary for such aging process. Coupled with the loss of freshness, flavor and decreased shelf life after the peeling due to the prior two to three weeks storage needed for aging, the economical loss and cost is enormous.

And even when such storage time is reduced by methods for accelerated aging as shown in '828, the eggs submitted to noxious fumes still need to be peeled mechanically, facing all the problems described above. Also, their flavor is effected by ammonia or lime soda, and their appearance is that of the aged eggs.

Thus, it would be advantageous to have available a method for peeling hard boiled eggs which would allow fast, safe, economical and efficient peeling of the hard boiled eggs which would at the same time preserve the flavor, freshness, extend the shelf-life and eliminate an unnecessary cost of storage connected with aging or eliminate the noxious fumes treatment prior to boiling eggs.

This invention addresses all the above stated problems and offers a feasible solution to these problems by introducing chemical or chemical/mechanical egg peeling.

SUMMARY

One aspect of this invention is a fast, safe and efficient peeling of the freshly laid hard-boiled eggs.

Another aspect of this invention is the peeling of the hard-boiled eggs by combination of chemical egg shell dissolution followed by a mechanical peeling of the loosened membrane.

Still another aspect of this invention is a chemical peeling of the hard-boiled egg with acid and/or alkali treatment followed by mechanical peeling.

Yet another aspect of this invention is the instantaneous separation of the membrane from albumen in freshly laid eggs thus allowing easy and efficient peeling of the fresh hard boiled eggs.

Still yet another aspect of this invention is to develop conditions under which a large number of freshly laid hard boiled eggs may be economically processed and effectively, quickly, and consistently peeled without loss of flavor, without change in the shape, texture and appearance, and without necessity to submit these eggs to extended refrigeration or to treatment with noxious fumes.

DETAILED DESCRIPTION OF THE INVENTION

The present invention is based on use of chemical means for softening of the egg shell and/or for peeling of the hard-boiled eggs by chemical means alone or in combination with mechanical means. The use of chemical means not only allows easier peeling but also allows the peeling of freshly laid eggs. In particular, this invention concerns process for dissolving the egg shell with the acid dip and a process for loosening the membrane from the egg white by the dip of the fresh egg in the lye solution.

More particularly, this invention concerns methods for chemical peeling or chemical conditioning of eggs in order to dissolve the shell or make the removal of the shells easier and to develop a large scale continuous process for preparing shelled eggs which is practical and economical. Eggs which are treated according to this invention do not require artificial aging or extended storage but can be cooked and shelled immediately after being laid by the chemical method disclosed herein combined with shelling by compressed air, pinchers, rollers or peelers typically used for the shelling operation.

The process of this invention substitutes effectively for natural aging process achieved by two to three week storage, or by artificially raising pH of the albumen by exposing the egg white to strong fumes of ammonia or lime soda for long periods of time. Short-time chemical treatment described herein with acid and/or alkali combined with higher temperatures effectively dissolves the egg shell and achieves the separation of the membrane from the egg white without a necessity to age the egg.

The process of this invention is useful for both, aged or freshly laid eggs. To preserve the freshness, taste, texture and to extend the shelf-life, preferably freshly laid eggs are treated. Using this process, the eggs as fresh as one hour after being laid are quickly and completely peeled without leaving behind the shell residue, without leaving the membrane residue, without having albumen broken or damaged, without change in shape, texture, taste or appearance.

There are three variations possible for using this process. First, the eggs may be submitted only to the acid treatment which dissolves the egg shell. Acid treatment is followed by a removal of the membrane mechanically. Second, the fresh eggs may be submitted only to alkali treatment where the membrane is effectively separated from the albumen and subsequently removed mechanically together with previously cracked egg shell. Third, and the most preferred variation is the combination of both acid and alkali treatment which effectively eliminates all problems which may be connected with the first and second variation.

In this invention, the sequence of events, timing and the process of the boiling of the eggs is important.

Prior to a chemical peeling, the fresh eggs are first hard-boiled. Generally, hard-cooking of the eggs is done by placing them in the cold water. In this invention, the eggs are placed in the boiling water. There is a large variation in cooking time, depending on the temperature of the water and of the eggs when they are immersed; however, boiling them for about ten minutes is generally sufficient. Eggs placed in the cold water and subsequently boiled are more difficult to peel mechanically than the eggs placed and boiled in the boiling water. For purposes of this invention, while placing the eggs in cold water is also possible, it is preferred to place the freshly laid eggs into boiling water, and cook the eggs for about 2-15 minutes, preferably around 10 minutes.

Alternatively, the eggs may be hard-cooked in a steam. Steam boiling is preferred because it prevents a leaking of albumen when the shell is broken. Such leaking often happens when the eggs are boiled in water. In this manner, eggs are placed in the steam chamber for 5-50 minutes, preferably for about 10 minutes. It is also possible and contemplated to be within purview of this invention to combine cooking eggs in steam for 3-50 minutes, preferably for 5 minutes and follow this by boiling them in the boiling water for 3-8 minutes, preferably 3 minutes. This procedure greatly reduces the consumption of energy.

Alternatively, it is also possible but not preferred to boil the eggs in diluted acid. However, acid boiling usually results in the deformed egg yolk, which is undesirable for food industry and catering. Moreover, boiling acid, regardless how diluted, in the end produces fumes, and it is thus difficult and dangerous to handle. It is also corrosive to the metal equipment surfaces and thus, on a long term, it causes damage to the equipment, if such equipment is not well protected or made out of plastic. Most importantly, when the larger number of eggs is boiled in the acid alone, the foam is produced. The acid foam may only be handled by adding defoamers which step, obviously, increases the cost of the process. Moreover, defoamers do not work well when vigorous foam is produced by boiling larger number of eggs. Also, the boiling of the eggs in the acid results in a great loss of acid caused by dissolved calcium chloride. Consequently, during and after the use, the acid needs to undergo continuous treatment to remove formed calcium chloride. Since calcium chloride is not allowed to be discarded into the drainage because it contaminates a soil, the used acid needs to be effluent treated with large amounts of water to remove calcium chloride by precipitation with sulfuric acid, by evaporation or by other methods. If the use of boiling acid can be modified to prevent foaming and calcium chloride formation, the cost connected with precipitation and defoaming will be avoided, effluent water will be saved and contamination of soil will be prevented. Any such treatment adds to the cost of labor, energy and equipment. Unless modified to avoid above stated disadvantages, acid use should be avoided, whenever possible.

Consequently, in the most preferred process of the shell dissolution, the eggs are placed in boiling water and boiled for 8 minutes, or in alternative, eggs are submitted to 5 or more minutes of hot steam (100° C. or more) treatment and 3 or more minutes of boiling.

Boiled eggs are promptly removed from the boiling water and are quickly cooled. This step prevents a development of a gray edging around the egg yolk surface.

Subsequent qualities of the eggs depend on and makes it desirable to promptly chill the eggs to about 4° C. or lower. Inadequately chilled eggs show early deterioration and may have shorter shelf life. The method of chilling depends on the extend to which the eggs are to be chilled. The eggs may be sprayed with cold water or submerged in or run through a liquid bath which has a temperature adequate to lower the egg temperature rapidly. For the large scale process, the eggs may be, for example, moved on a conveyor to a cooling chamber or blast freezer, filled either with a cold water, cold air or cold inert gas.

THE FIRST VARIATION—AN ACID TREATMENT

Boiled and cooled eggs are dipped in 0.1-10%, preferably around 5% acid, such as inorganic hydrochloric, phosphoric or sulfuric acid, or organic carboxylic acids such as citric acid, acetic acid, propionic acid, butyric acid, oxalic, malonic, succinic, glutaric, maleic, fumaric and such other acids, or to certain salts, such as ammonia chloride, preferably 5% hydrochloric acid, citric acid or acetic acid, at 40–100.C, preferably at 60° C. for 10 seconds to 48 hours, preferably for 1 to 2 hours. After the acid dip, the egg shell is dissolved or almost completely dissolved or softened.

In alternative, the eggs may be dipped in the boiling acid, preferably 1% hydrochloric acid for 1-2 minutes. However, when the boiling acid was used, there was excessive foaming after few batches were boiled and it became impracticable to use boiling acid without adding defoamers. After about 2-3 batches, the acid solution needed to be replaced with the fresh one because most acid is converted to calcium chloride. Also, when the acid is boiled, it produces fumes which may be hazardous, corrosive, unpleasant to handle and would cause a depletion of the acid, unless the process for acid fumes regeneration is included in the process.

In other alternative, the hard-boiled eggs, as described above, may be dipped in cold acid having temperature from 0-25° C., warm acid having temperature from 25-30° C. and hot acid having temperature from 51-99° C. of various concentrations between 0.1-10%, preferably 5%, for times required to dissolve the egg shell from about 2 hours to maximum of 4 days, which times may be from 0.5 minute to about 2 hour, depending on the acid condition, i.e., on the acid concentration and on the temperature.

To eliminate fumes and foaming, the acid having the lower temperature than boiling acid has been found preferable. In case of using acid having a room temperature, for example, the concentration is usually 5% and eggs which are submerged in the acid for about 5-30 minutes are previously boiled for at least ten minutes to be fully boiled. This acid treatment eliminates the formation of the foam, however, it requires longer time dip in the acid.

In this instance, the acid concentration up to 5% was found to be in correlation to the time needed for shell dissolution. The cold 1% and 3% hydrochloric acid dip needed longer than 24 hours, while 5% and 10% both needed 20 hours for complete dissolution of the shell from the hard boiled eggs. In case of 5% and 10% acetic acid dip, it took at least 48 hours to dissolve the shell, with 1% and 3% taking substantially longer. 5% or 10% citric acid dissolved the shell in around 4 days. The peelability of all eggs submitted to the acid treatment was improved, i.e., it was easier and faster.

Advantages of dipping hard-boiled eggs in the cold acid were as follows. The membrane remained intact. The shape of the egg was undisturbed. The taste was not severely affected, although it could be slightly acidic. The color of the egg white and yolk was unchanged. The removal of the egg membrane was easy whether effected manually or mechanically by rollers or pinchers. There was no problem with foaming or fumes. One but important disadvantage of this process which made the resulting hard-boiled peeled egg unacceptable was that in some cases the egg texture was soft and mushy. The change in texture was caused by a longer dip in the acid solution, usually beyond two days.

To eliminate the fumes and foaming caused by the boiling acid dip, or to eliminate the change in texture caused by extended submersion in the cold acid, the third, and a most preferred variation of acid treatment was used. In this process the eggs were dipped in the warm 5% acid at temperature of 60° C. for 2 hours. At the end of 2 hours the shell was completely dissolved but taste, appearance, texture, shape and color were uneffected.

The correlation of acid concentration to the acid temperature to the time needed for shell dissolution is one of the important features of this invention. By varying each of the modifiers, i.e., the higher acid concentration, the shorter time is needed, and vice versa, the unwanted results may be eliminated. For example by varying the temperature of the acid dip, by using the higher temperature of the acid, the shorter time is needed for shell dissolution but there is foaming and acid fumes which makes this variation impractical and much more costly. In the terms of the time, the shorter dip time the better for the egg texture but for short time dip, the higher concentration of acid and high temperature are needed which may result in foaming and fumes. Thus, the best correlation was found somewhere around 5% acid at temperature around 60° C. for about 2 hours.

Treated eggs with acid, according to the procedure described above, typically loose their shell but remain to be covered with membrane which does not dissolve in the acid. Therefore, the membrane must be removed either mechanically or preferably be treated with alkali to get disattached from the albumen (variation three).

Thus, in one process of this invention, the peeling of the hard-boiled eggs is achieved solely by the shell dissolution in the acid which leaves the egg enveloped in the membrane which is removed by the use of pinchers or rollers. If the peeling of eggs is done at a time when the eggs are still hot, the membrane may be easily pinched without need for lye treatment. The eggs are then cooled, acid is neutralized with weak base and acidified with dip to citric acid for preservation. This process eliminates problems connected with foaming, fumes and with the shell remainders sticking to the membrane and consequently sticking to or tearing the egg albumen. Thus, this process eliminates incompletely peeled eggs which require manual control and sorting. The egg shell acid dissolution process also eliminates the use of mechanical peelers which are imperfect, crude, need lots of power to break and remove the shell and therefore cause high percentage loss of the hard-boiled egg. Similarly, the method eliminates a need for all follow-up procedures needed to check the peeled eggs for damage to the albumen and to remove the remnants of the shell following mechanical peeling.

The formation of fumes is controlled by the acid temperature, or by the installation of the exhaust fume hood having optionally inserted water filed trap into which the fumes would be caught and dissolved, providing thus for a recovery of certain amount of the acid. The foaming acid may be typically treated with defoamer, such as vegetable oils or silicon defoamers commercially available for example from Dow Chemical Corporation or other commercial sources.

The acid dip used for hard boiled eggs is generally followed by dip in the weak alkali to neutralize the acid. Such process is primarily used to loosen the membrane attached to the albumen. However, the brief 5-15 seconds, dip in the 1% alkali may also be used in the first variation to neutralize the acid taste which may effect the taste of the egg white and prevent the discoloration of the yolk.

The acid dissolution of the hard-boiled egg shells may be further advantageously facilitated with the prior alkali dip, such as, for example, dip in 1-4% preferably in 2% of sodium hydroxide, potassium hydroxide and other bases. The alkali dip is preferably at boiling temperature and lasts for about 10-60 seconds, preferably around 30 seconds. This pretreatment shortens the time needed for the acid egg shell dissolution but introduces another step into the first variation process.

THE SECOND VARIATION—AN ALKALI TREATMENT

The second and most preferred process for efficient and fast peeling of hard-boiled eggs concerns a separation of the inner membrane from the egg white by alkali treatment. This process may be used as a follow-up step on the above described dissolving the egg shell by the acid (variation three), or it may be used alone.

In the third variation, the acid dissolution is followed by the loosening of the membrane by the alkali dip which step in turn is followed by the peeling of the membrane using any kind of known pincher, roller or other suitable machine. In the second variation, the alkali treatment is followed by a mechanical peeling using any type of known mechanical peeler, as described below. In the second variation, the egg shell is intact but preferably cracked before the alkali treatment to allow the alkali contact with the egg inner membrane.

In practice, the second variation process which is the most preferred comprises dipping the cracked fresh hard-boiled egg in the diluted 0.1-5%, preferably around 1% of alkali solution, such as solution of sodium hydroxide, potassium hydroxide, calcium hydroxide, magnesium hydroxide, ammonium hydroxide, barium hydroxide, sodium carbonate, potassium carbonate, and such as other bases, preferably in 0.1-5%, preferably around 1% of lye, a solution of sodium or potassium hydroxide at temperature from room temperature to 100° C., for time from 5 seconds to 15 minutes, preferably no more than 2 minutes. There is a correlation between the temperature and time. When the temperature of the alkali is lower, the process needs more time. Conversely, when the temperature is higher, the less time is needed. The time alone is important because if the eggs are submitted to alkali for a long time, the membrane and also the albumen is melted and gets yellow. The yellowing may be reversed by dipping the egg in the citric acid, the step commonly used at the end of the peeling process for extended shelf life. Such step is a part of this process. None of these conditions is desirable for a large scale processing of hard boiled eggs. Optimal conditions allow as long alkali dip as possible to loosen the membrane but avoid yellowing of the albumen.

Such optimal conditions were found to be the dipping eggs in boiling 1% lye for around 1–2 minutes. Experiments showed that under these conditions the peeling was fast, easy and effective.

When the alkali dip alone is used for peeling of hard boiled eggs, the eggs are preferably cracked after being boiled but before being submerged into the alkali bath. Cracking may be achieved by any means suitable to crack the eggs but not to break them. It is preferred that the egg is cracked more than having just a pin hole made. In practice, the hard-boiled eggs may be, for example placed on the tray or conveyor having the tray rattled against hard surfaces for cracking, or the flat platform may be gently dropped on the top of the eggs placed on the tray so that the tops of the eggs are cracked while these eggs roll or rotate on the tray.

Following the alkali chemical treatment, egg membrane may be removed or shells may be broken, segmented or shelled by numerous means. For removal of egg shell, the eggs may be placed for example in a shaking machine such as a shaker which moves and jars or rattles the eggs against hand surfaces in such a way that the shells are broken, followed by pressure or water jet for shell removal. Another means for shelling is to conduct the shell eggs between two belts, an egg-size tunnel which strips eggs of their shell or a series of rollers that approximate one another closely enough so as to break or segment the shells. Another way to remove egg shells is by segmenting, cracking, breaking, or crushing and subsequently hitting the shell with a water jet or stream of air. The water jet or stream of air must penetrate the inner and outer shell membranes lying immediately beneath the shell but must be gentle enough to avoid the breaking of the albumen. Once the shell membranes have been penetrated, the air will follow the surface contour of the egg or the area lying between the inner shell membrane and the coagulated albumen and remove the shell and the shell membranes from the conventionally edible parts of the egg. The care must be taken not to expose the egg to extensive contact with water. The shell removal process should be regulated so that neither the albumen nor the yolk is broken or otherwise damaged. Other means for removing the shell from the egg, such as by brushes or by washing the shell off with a stream or spray of water will be obvious to one skilled in the art.

After the egg shells have been removed, the eggs may be washed by any suitable means, such as in a water bath or water spray, etc., followed by dip in citric acid around 1% for longer shelf life, but excessive contact with water is undesirable as it changes the texture of the egg.

The above discussed methods for removing the shell will be used in cases when the shell will be either incompletely removed, i.e., using the acid treatment which does not dissolve the shell completely and when such shell is only partially dissolved or softened, or in the case when the eggs are treated solely by the alkali bath (variation two) when the shell is precracked but not dissolved, softened or removed otherwise. Dipping the cracked eggs in alkali makes it easier and faster to remove the shell by mechanical means.

THE THIRD VARIATION—THE ACID TREATMENT FOLLOWED BY THE ALKALI TREATMENT

The third variation is the treatment of the eggs with acid followed by the treatment with alkali.

In this variation, the hard boiled eggs are first dipped in the boiling acid, preferably 1% boiling hydrochloric acid, as described in the variation one, and when the egg shell is dissolved, or almost completely dissolved, preferably completely dissolved so that the eggs are covered only with the membrane, the eggs are transferred for short period of time to the alkali bath.

Eggs, particularly fresh eggs treated with acid are submitted to the step causing the loosening of the remaining membrane surrounding the hard boiled egg. Such loosening is generally achieved by dipping the eggs into the alkali solution. Such alkali treatment promptly loosens the membrane from the egg white and allows for fast peeling. While the acid dip effectively removes the shell from the egg, the alkali dip effectively loosens the membrane from the albumen and is thus the primary reason for easy peeling of freshly laid eggs without damaging albumen to which the membrane is otherwise tightly attached.

The alkali dip is the same as described above in the variation two. After the membrane is loosened, the eggs are removed from the alkali bath and optionally washed with water and the alkali is neutralized by wash with weak acid, preferably 0.1–1% citric acid.

In this variation when the hard boiled eggs are submitted to the acid treatment, when the shell is completely removed, and the membrane is loosened by the alkali dip, the remaining membrane is removed by pinching, rollers, air stream, stripping and some such other means which will effectively remove the membrane only, but will leave the albumen intact and undamaged. Membrane removing machine may be, for example simple cover over the tray containing eggs, which cover has attached the same number of fingers or pinchers as there are eggs on the tray, which fingers will be soft and will gently encircle the egg. By raising the cover, the fingers will gently peel the membrane from the pretreated eggs placed on the tray. Similarly, the membrane may be removed by suction or by any other means known in the art and suitable for these purposes.

LARGE SCALE PROCESSING

For the large scale processing of the hard boiled eggs by the first variation mode, a movable conveyor having trays for placing large number of eggs would be used. The movable conveyor would be moved through the sequence of chambers where: 1) the eggs would be submerged in boiling water or passed through the steam or passed through steam and boiling finished by submerging in boiling water; 2) the eggs would be cooled; 3) the eggs would be submerged into the acid bath at 60° C. temperature optionally containing defoamer 4) from still hot eggs the membrane would be removed by the pinchers, rollers or by other means; 6) the eggs would be briefly dipped in alkali, sprayed with water and a weak acid for preservation; 7) egg surface would be dried in the air stream and; 8) the eggs would be rolled out and preserved or packaged for storage and transportation.

In another and most preferred mode (the second variation) of the large scale processing, wherein only the alkali bath is used: 1) the eggs would be submerged into boiling water or passed through the steam, boiled or steamed; 2) the eggs would be cooled; 3) the egg shell would be cracked by rattling or shaking; 4) the eggs would be submerged in the alkali bath; 5) the egg shell and the membrane would be removed by the rollers or any other existing mechanical means; 6) the eggs would be briefly sprayed with water; 7) the eggs would be dipped in weak acid to wash out and neutralize the alkali from the albumen, extend shelf-life, and to reverse a pigmentation; 8) egg surface would be dried in the air stream; and 9) eggs would be rolled out and preserved or packaged for storage and transportation.

In still another mode (the third variation) of the large scale processing, wherein the combination of both acid and alkali is used: 1) the fresh eggs would be boiled or steamed; 2) the eggs would be cooled; 3) the eggs would be submerged into the boiling acid bath containing defoamer and having the fume hood for removal of the acid fumes with water trap for regeneration of the acid; 4) the eggs would be submerged into alkali bath; 5) the membrane from the eggs would be removed by the pinchers or rollers; 6) the eggs would be briefly sprayed with water to wash out the alkali from the albumen; 7) the eggs would be washed with citric acid to neutralize alkali, extend shelf-life and present pigmentation; 8) the egg surface would be dried in the air stream and; 9) eggs would be rolled out and preserved or packaged for storage and transportation.

A number of factors would determine whether peeled eggs need to be pasteurized. One factor would be the length of time that the eggs must remain edible. If the eggs were to be consumed on the day or the day following processing, pasteurization would not be urgent. However, if eggs were to be put through the conventional trade channels, then pasteurization would be necessary. The surface of the shelled eggs may be pasteurized with steam, by means of hot liquid or by any other means used in the industry.

After the shelled eggs have been washed and/or pasteurized, they may be package individually or placed in cartons. This may be accomplished by automatically inserting the eggs placed on the egg plastic tray in a bag-type container such as those made of plastic films and subsequently sealing the bag under vacuum. The bag or other container may be back-filled with inert gases prior to sealing so called modified atmosphere packaging. Also, the shelled eggs may be packaged in any suitable egg carton-type container which can be subsequently mechanically sealed and placed in suitable shipping containers. Alternatively, eggs may be pickled or stored in a pickling solution.

UTILITY

This invention represents a new technology providing to the food industry pre-peeled hard cooked eggs having long-duration shelf life, appearance of the freshly cooked egg and no loss of taste or texture. Hard boiled eggs are often offered by restaurants and food chains in unprocessed or processed form. Hard boiled unprocessed eggs are offered to customers unpeeled. On the other hand, majority of the hard boiled eggs used in the food industry are used to garnish salads and other food or as a salad or salad bar ingredients or for pickling. Since many of these uses depend on an appealing appearance of eggs, it is important to be able to supply hard boiled pre-peeled eggs which have no damaged albumen and which have no remnants of the shell present. For these purposes, the eggs with nicked, scored or etched membrane surface or with remnants of the shell or of the albumen remaining on the peeled hard boiled egg are not acceptable. Moreover, the food industry is very interested to get hard boiled pre-peeled eggs as fresh as possible. As described above, since the fresh eggs have a pH of about 7.5 and the peeling has been shown (*Poultry Sci.,* 48:1145 (1969)) to be optimal at pH 8.7–8.9, the eggs normally need to be stored for about two weeks before this optimal pH for peeling is achieved. This considerably shortens the shelf-life of subsequently peeled eggs. At that time, the surface of the egg yolk may already begin to turn gray which coloring significantly decreases delectability and colorful appeal to taste buds. Moreover, after 40 days of storage, the eggs may become rotten and unedible. Thus, for the food industry the freshness of the hard boiled eggs is a serious consideration. Aside of the health, aesthetics, and gastronomical consideration, there are also economical considerations which need to be addressed, such as the need for cold storage until the pH is right for peeling, the need for manual control of peeled eggs to remove any remainder of the shell after peeling, or waste caused by discarding the eggs with etched albumen or otherwise damaged surface which can only be used at low price as chopped eggs for egg salad.

This invention meets all aesthetical, gastronomical, health and economical requirements. It allows peeling of fresh hard boiled eggs thus eliminating a requirement for long-term storage and allows a fresh eggs to be immediately available to the consumer. When these fresh eggs are supplied, both their appearance and taste are better than two weeks aged eggs.

The current invention also eliminates the need for manual peeling or manual control of pre-peeled eggs because the chemical pre-peeling either loosens the albumen membrane of the cracked eggs (the second variation) and allows it to peel it easily and completely with pinchers or rollers, or dissolves the egg shell chemically (the first variation), or combines both of the above processes (the third variation) with mechanical peeling which can utilize currently available mechanical peeling equipments. Thus, the new process of this invention is capable of being incorporated into any existing mechanical peeling process without need to substitute or completely remodel such system.

The following examples are intended to illustrate various aspect of this invention. They should not be interpreted as limiting or narrowing the scope of this invention in any way.

EXAMPLE 1

ACID DISSOLUTION OF THE SHELL OF HARD-BOILED EGGS

This example illustrates the dissolution of the shell of hard-boiled eggs using acidic conditions (variation one). Hard-boiled eggs were placed into a variety of acid solutions at varied concentrations and temperatures to determine the feasibility of using different acids for chemical peeling.

A. Fresh eggs were placed in boiling 1% or 2% HCl for 5 minutes. In both instances, the eggs were only soft boiled and remained contained in the egg membrane. The eggs could be subsequently cooked in water to reach hard-boiled egg state. Using this process, the shape of the eggs was affected and unless dipped in the alkali, the membrane remained attached to the albumen.

B. Fresh eggs were dipped in boiling 5% HCl. The shell dissolved rapidly in around 1-2 minutes, leaving behind a liquid egg enveloped in the membrane. However, the acid rapidly boiled over when the eggs were submerged, and cooking the liquid egg in the membrane in the boiling water provided uncontrollable shape. Fumes and foaming were excessive.

C. Fresh eggs were dipped in boiling 2% sulfuric acid for ten minutes. There was no dissolution of the shell other than minor etchings at this concentration.

D. Fresh eggs were dipped in boiling 5% sulfuric acid for ten minutes. Again there was no significant effect on the shell at this concentration.

E. Fresh eggs were place in boiling phosphoric acid 2% and 5% for ten minutes or more. Similarly to sulfuric acid, there was no significant dissolution of the shell.

F. Fresh eggs were placed in 2% and 5% citric acid and let boil for 10 minutes. The shell was almost completely dissolved but not as rapidly as in hydrochloric acid.

G. Fresh eggs were placed in boiling ammonium chloride for ten minutes. Egg shell was dissolved similarly to when boiled in acid.

H. Fresh eggs were placed in 1, 2 and 5% hydrochloric acid at 60° C. temperature until the shell dissolved. At that time, the shell dissolved, taste, appearance, shape and color were unchanged. 5% acid took 2 hours, 2% acid took 4 hours, 1% took over 24 hours to completely dissolve the shell.

When the hot eggs were removed from the acid, the peeling of the membrane was very easy and fast.

The chemical treatment of eggs with boiling acids or certain salts such as ammonium chloride, resulted in dissolution of the shell membrane when the eggs were cooked in boiling acid or salt. Both the taste and color of the egg albumen was effected. The albumen, particularly following the acid treatment was taking on yellowish discoloration and boiled eggs took on a strong acid taste. Alkali were not suitable or effective for shell dissolution.

Lower boiling temperature acid dips resulted in dissolution of the shell, easy peeling of the membrane and unchanged taste, color, texture, shape and appearance.

Discoloration was controlled by pre-boiling eggs in water for 8 minutes then submerging the eggs for 2 minutes in boiling 1% HCl for shell dissolution. The acid taste was controlled by dipping the shell-less egg in a basic solution of 2% NaOH for 30 seconds with subsequent rinsing in cold water. After alkali, the eggs were dipped in the acid, washed with water and rinsed with citric acid.

Following such treatment, majority of the eggs preserved their color, appearance and taste.

EXAMPLE 2

ALKALI SEPARATION OF THE MEMBRANE FROM ALBUMEN

This example illustrates the separation of the membrane from the albumen by alkali treatment. The fresh untreated eggs or the eggs treated with acid according to Example 1 were dipped in sodium hydroxide or lye solutions of various strength for varied time periods.

A. Shell-less eggs from the Example 1 were dipped in boiling 1% sodium hydroxide. The time needed for loosening of membrane and ultimate dissolution of the membrane was well over 1 minute. At 75 seconds, the membrane was loose enough to be mechanically removed. At 90-120 seconds, the membrane completely dissolved but the surface of the albumen was nicked.

B. Shell-less eggs from the Example 1 were dipped in boiling 2% sodium hydroxide and the time needed for egg membrane loosening or dissolution was measured. In 30 seconds, the membrane was loosened enough to be mechanically removable but not completely dissolved and the surface of the albumen was not affected.

Shorter exposure, 30 seconds up to 1 minute were found the most effective and least damaging to the albumen. Exposures longer than 1 minute resulted in the damage to the albumen.

C. The shell of untreated fresh eggs were cracked and eggs were dipped in boiling 1% lye solution for 30 seconds, 1, 3, 5 and 10 minutes and the time for loosening the membrane from the albumen was measured.

In 30 seconds, the membrane was somehow loosened but not enough for easy peeling. After 1 minute lye dip, the membrane was easy to peel and the surface of the albumen was undamaged, the color and texture were not changed and the taste was not affected. After 3, 5 and 10 minutes treatment, the color and texture got progressively more affected, albumen was nicked or etched. At 10 minutes, the taste was definitely affected.

EXAMPLE 3

FACILITATION OF THE DISSOLUTION OF SHELL BY ACID

This example illustrates the facilitation of the shell dissolution by acid.

Before submerging the fresh eggs in the boiling acid, according to the Example 1, they were boiled for 30 seconds in 2% sodium hydroxide. This pre-treatment shortened time needed for dissolution of the shell by 1% hydrochloric acid to 2 minutes.

EXAMPLE 4

PROCESS FOR ACID PEELING OF HARD-BOILED EGGS

This example illustrates a large scale process for chemical peeling by acid treatment (variation one) of the hard boiled eggs. Using this process, the chemical peeling of about several thousands eggs per hour per conveyor was done effectively and fast.

TABLE 1

| TIME | CONDITIONS | RESULTS |
| --- | --- | --- |
| 10 minutes | Hot steam | Cooking |
| 5 minutes | Boiling water | Cooked egg |
| 2 hours | 5% HCL at 60° C. | Shell dissolution |
| Dip (Optional) | Boiling water rinse | Removes acid residue |
| 15 Seconds | Boiling 2% NaOH | Neutralizing acid |
| — | — | Mechanical removal of the loose membrane |
| Dip | Boiling water | Rinsing |
| 2 minute soak | Cold water and citric acid | Cooling, neutralizing and preservation |

In alternative, hydrochloric acid treatment is substituted with 5% acetic acid for the same time and at the same temperature.

For the large scale chemical peeling, the multichamber conveyor is used having a rail along which the one or several layers of the egg trays moves. The conveyor moves slowly through the system of multiple chambers timed so that the slowly moving egg trays are submitted to each treatment, as outlined in Table 1, for times specified. Thus, the eggs are first moved to the steam and boiling chambers and stay 10 and 5 minutes, respectively. Then they are moved to the boiling acid chamber optimally equipped with fume hood and/or containing defoamer where they stay or are moved through it for about 2 minutes. In the next chamber, the eggs are sprayed with boiling water and forwarded to the next chamber containing boiling alkali for brief dip. After moving out from the alkali bath, the cover having the same number of soft fingers or pinchers as the number of eggs on the tray is used to remove the loosened membrane. The egg trays are moved to the next chamber where they are sprayed with boiling water and moved to the chamber containing either cold water or diluted citric acid to neutralize the alkali remaining on the surface of the eggs and to cool and preserve them. Then, the egg trays are moved into processing or packaging department.

Following this process, all eggs were easily peeled without leaving behind the shell residue. However, the acid bath was exhausted after multitude of trays moved through and same foaming was present unless sufficient quantity of defoamer was used. There could also be a production of fumes which made the process impractical without introducing a fume hood and taking other precautions.

EXAMPLE 5

NON-ACID CHEMICAL PEELING OF FRESH HARD BOILED EGGS

This example illustrates the chemical peeling of fresh hard boiled eggs solely under the basic conditions (variation two) eliminating the use of acid. The peelability was determined for eggs cooked in cold water or hot water followed by treatment in various concentrations of the base at different pH and for different time of treatment. The general experimental conditions were as follows.

60 uncracked freshly laid eggs were put on a plastic tray and submerged in a metal vessel containing boiling water. The eggs were boiled for 10 minutes. In alternate experiments, eggs were boiled in steam followed by shorter 3-5 minutes boiling in boiling water. The water was then removed. The egg shell was cracked by solid metal plate gently dropped on the tops of the eggs until there was visible crack in the shell and the eggs were rolled and rattled against its hard surface. The vessel was filled with 1% solution of lye and the eggs were submitted to alkali bath for 1 minute. The alkali solution was removed from the vessel and the eggs were quickly rinsed with cold water. Then, the eggs were submitted to manual peeling and the ease of peelability was scored from 1 to 5. The score 1 was given when it was very easy to peel the eggs, when no visible damage to albumen and no remnants of the shell or the membrane were present. The eggs appearance and taste was also noted. The inner pH of the albumen was measured to determine the effect of aging on the peelability.

The eggs submitted to this treatment were easy to peel by simply peeling the shell and pinching the membrane and removing it. The pH of the albumen was around 8.6-9.1. The appearance, texture and taste of the eggs were not affected. Overall, all eggs were easily peeled without leaving any shell residues behind. Mechanical peeling by water or air jet was fast and efficient.

EXAMPLE 6

PROCESS FOR ALKALI PEELING OF FRESH HARD-BOILED EGGS

This example illustrates a large scale process for chemical peeling of the hard boiled eggs by the alkali treatment (second variation). Using this process, the chemical peeling of about several thousands eggs per hour per conveyor can be done effectively and fast.

TABLE 2

| TIME | CONDITIONS | RESULTS |
| --- | --- | --- |
| | | Fresh eggs |
| 10 minutes | Hot steam | Boiling |
| 5 minutes | Boiling water | Cooked eggs |
| | | Cracking the shell |
| 60 Seconds | Boiling 2% Lye | Loosening membrane |
| — | | Mechanical removal of the loose membrane |
| Spray | Boiling water | Rinsing |
| 2 minute soak | Cold water and citric acid | Cooling, neutralizing and preservation. |

In alternative, lye treatment is substituted with 2% sodium hydroxide or potassium hydroxide for the same time and at the same temperature.

For the large scale chemical peeling by alkali, the multichamber conveyor is used having a rail with one or several layers of the egg trays. The conveyor moves slowly through the system of multiple chambers timed so that the slowly moving egg trays are submitted to each treatment, as outlined in Table 2, for times specified. Thus, the eggs are first moved to a chambers containing hot steam and boiling water. Then, the eggs either stay in the steam and boiling chambers and/or move through them for 10 and 5 minutes, respectively. In the next dry chamber, the eggs are cracked by the metal cover gently dropped on the eggs to break the top of their shell while the tray was rolling and the chamber is shaking and rattling. Then the eggs are moved to the boiling alkali for 1 minute. In the next chamber, the eggs are sprayed with boiling water and moved to a peeling machine, to remove the loosened membrane having attached cracked shell. The egg trays optionally move to the next chamber where they are sprayed with the jet of boiling water to remove any residues of shell and to prevent contamination from shell residue and then moved to the next chamber containing cold water and-/or diluted citric acid to neutralize the alkali remaining on the surface of the eggs and to cool them. Then, the egg trays are moved into processing or packaging department.

The eggs treated in this manner are easily and completely peeled. They have no shell or membrane residues and are not contaminated. Their taste, shape, color, texture and appearance is not effected.

EXAMPLE 7

ACID-ALKALI PROCESS FOR CHEMICAL PEELING HARD-BOILED EGGS

This example illustrates a large scale process for chemical peeling of the fresh hard boiled eggs by acid-alkali treatment (variation three). Using this process, the chemical peeling of about several thousands eggs per hour per conveyor can be done effectively and fast.

TABLE 3

| TIME | CONDITIONS | RESULTS |
| --- | --- | --- |
|  |  | Fresh raw eggs |
| 10 minutes | Hot steam | Boiling |
| 5 minutes | Boiling water | Cooked egg |
| 2 min. (approx.) | Boiling 1% HCL Defoamer | Shell dissolution Eliminates foam |
| Dip | Boiling water rinse | Removes acid residue |
| 60 Seconds | Boiling 2% NaOH | Loosening membrane and neutralizing acid |
| — |  | Mechanical removal of the loose membrane |
| Dip | Boiling water | Rinsing |
| 2 minute soak | Cold water and citric acid | Cooling, neutralizing and preservation |

In alternative, instead of hydrochloric acid, 2,5% acetic acid, or 2.5% citric acid for acid treatment step, and 1% lye, 2% KOH or NH$_4$OH is used. Longer time is used for acid treatment using these substitutes.

For the large scale chemical peeling, the multichamber conveyor is used having a rail with one or several layers of the plastic egg trays. The conveyor moves slowly through the system of multiple chambers timed so that the slowly moving egg trays are submitted to each treatment, as outlined in Table 3, for times specified. Thus, the eggs are first moved to the chamber containing steam and then to boiling water. The eggs stay in or are moved through the boiling chambers for total 15 minutes. Then they move to the boiling acid chamber filled with boiling 1% HCl where they stay for about 2 minutes or until the shell dissolves. If the substitute acid is used, the time will be longer. The chamber is equipped with the fume hood and the water trap for acid restoration. Defoamer is added to the acid in amount which suppresses foaming, according to Example 8. The acid is removed after several load of the eggs passes through it and is submitted to waste treatment and acid regeneration according to Example 9. In the next chamber, the eggs are sprayed with boiling water to rinse off the acid and forwarded to the next chamber containing boiling alkali. After moving out from the alkali bath, the eggs move along the rail and the cover having the same number of soft fingers or pinchers as there are eggs on the tray remove the loosened membrane. The egg trays are then moved to the next chamber where they are sprayed with boiling water and moved to the chamber containing either cold water or diluted citric acid to neutralize the alkali remaining on the surface of the eggs and to cool them. Then, the egg trays are moved into processing or packaging department.

The large number of fresh hard-boiled eggs may be processed efficiently without loss in quality and quantity. There is more than 80% but rather close to 100% yield in completely peeled eggs. The taste, shape, appearance and texture are not affected. The fresh eggs do not require long prior storage and may be delivered to restaurants or processing plants within several hours from being laid. Thus, the freshness of the product is guaranteed and the subsequent shelf-life is maximally extended.

EXAMPLE 8

SUPPRESSION OF FOAMING

This example illustrates suppression or complete elimination of foaming during acid boiling.

2.5% of hydrochloric acid solution as used in Example 1, was covered with a thin film of Wesson vegetable oil. The solution was brought to a boiling and an egg submerged in the solution. Peeling of the egg shell by dissolution was not affected and foaming was decreased to a reasonable and acceptable level. The procedure was suitable for several eggs after boiling several eggs (12), however, the solution developed stale and rancid smell. The added oil also effected the membrane which became sticky and had to be treated with cool 2% NaOH to remove stickiness and neutralized with a small amount of 1% acetic acid.

In similar manner, Dow Corning foam suppressants were used over the boiling acid. All these agents reduced foaming but at the same time decreased effectiveness of the chemical peeling by the acid. After each 3–5 eggs, new acid had to be added.

EXAMPLE 9

WASTE TREATMENT AND ACID REGENERATION

This example illustrates how the waste acid with dissolved egg shell is regenerated into reusable acid solution.

The exhausted peeling solution, i.e., acid containing dissolved calcium chloride was treated with sulfuric acid to result in solid calcium sulfate and hydrochloric acid, according to the equation:

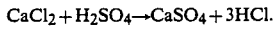

$$CaCl_2 + H_2SO_4 \rightarrow CaSO_4 + 3HCl.$$

The hydrochloric acid was then suitable for reusing for peeling.

The process was carried out in an ion exchange system designed for the removal of solid calcium sulfate or in something similar to a settling bond where the liquids could be mixed and the reconstituted hydrochloric acid pumped off. Alternatives to sulfuric acid include citric acid which would produce calcium citrate or phosphoric acid which would produce calcium phosphate as a by-product.

What is claimed is:

1. A method for peeling hard cooked eggs comprising:
   (a) cooking the eggs in steam or water for 2–10 minutes;
   (b) dissolving the egg shell by submerging the cooked eggs into a 0.1–10% solution of acid or of ammonium chloride for 10 seconds to 48 hours; and;

(c) mechanically removing the egg membrane from the hard-cooked eggs.

2. The method of claim 1 wherein the acid is hydrochloric acid, citric acid, or acetic acid.

3. The method of claim 2 wherein the concentration of the acid solution is 5%.

4. The method of claim 3 wherein the acid solution temperature is between 20–100° C.

5. The method of claim 4 wherein the acid solution temperature is 60° C.

6. The method of claim 5 wherein the eggs are dipped in the acid solution for 0.5 to 2 hours.

7. The method of claim 6 wherein the eggs are dipped in the acid solution for 2 hours.

8. A method for peeling hard cooked eggs comprising:
   (a) cooking the eggs in steam or water for 2 to 10 minutes;
   (b) cracking the egg shell of the eggs of step (a);
   (c) treating the eggs of step (b) by submerging in a 0.1–5% alkali solution; and
   (d) mechanically removing the shell and the membrane from the hard-cooked eggs.

9. The method of claim 8 wherein the alkali is sodium hydroxide, potassium carbonate, potassium hydroxide, or ammonium hydroxide.

10. The method of claim 9 wherein the alkali temperature is between 20° C. and 100° C.

11. The method of claim 10 wherein the alkali solution is 1–2%.

12. The method of claim 11 wherein the eggs are treated with the alkali solution for 30 seconds to 5 minutes.

13. The method of claim 12 wherein the alkali solution is 1%–2% sodium hydroxide.

14. The method of claim 13 wherein the alkali solution is 1% sodium hydroxide and the eggs are treated for 60 seconds.

15. A method for peeling hard cooked eggs comprising:
   (a) cooking the eggs in steam or water for 2 to 10 minutes;
   (b) treating the eggs of step (a) by submerging in a 0.1–10% solution of acid or of ammonium chloride;
   (c) treating the eggs of step (b) by submerging in a 0.1–5% alkali solution; and
   (d) mechanically removing the membrane from the eggs of step (c)

16. The method of claim 15 wherein the acid is hydrochloric acid, citric acid, or acetic acid.

17. The method of claim 16 wherein the acid solution temperature is between 20–100° C.

18. The method of claim 17 wherein the acid treatment lasts 2 minutes to 24 hours.

19. The method of claim 18 wherein the alkali is sodium hydroxide, potassium carbonate, potassium hydroxide, or ammonium hydroxide.

20. The method of claim 19 wherein eggs are treated with the acid solution for 30 seconds to 5 minutes.

21. The method of claim 20 wherein the eggs are treated with the sodium hydroxide solution for 30 seconds to 2 minutes.

* * * * *